(12) United States Patent
Kiga

(10) Patent No.: US 10,486,411 B2
(45) Date of Patent: Nov. 26, 2019

(54) SHAPING APPARATUS AND SHAPING METHOD

(71) Applicant: CANON KABUSHIKI KAISHA, Tokyo (JP)

(72) Inventor: Noboru Kiga, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 15/217,149

(22) Filed: Jul. 22, 2016

(65) Prior Publication Data
US 2017/0028629 A1 Feb. 2, 2017

(30) Foreign Application Priority Data

Jul. 29, 2015 (JP) ................................. 2015-149421
Jul. 8, 2016 (JP) ................................. 2016-136287

(51) Int. Cl.
| | | |
|---|---|---|
| *B33Y 30/00* | (2015.01) | |
| *B29C 35/02* | (2006.01) | |
| *B33Y 10/00* | (2015.01) | |
| *B29C 64/141* | (2017.01) | |
| *B29C 64/20* | (2017.01) | |
| *G03G 15/22* | (2006.01) | |

(52) U.S. Cl.
CPC .......... *B33Y 30/00* (2014.12); *B29C 35/0277* (2013.01); *B29C 64/141* (2017.08); *B29C 64/20* (2017.08); *B33Y 10/00* (2014.12); *G03G 15/224* (2013.01); *G03G 15/225* (2013.01)

(58) Field of Classification Search
CPC ......... B29C 64/00; B29C 64/10; B29C 64/20; B29C 64/205; B29C 64/295; B29C 64/30; B33Y 10/00; B33Y 30/10; G03G 13/20; G03G 15/20; G03G 15/2053; G03G 15/2014; G03G 15/221; G03G 15/224; G03G 15/24
See application file for complete search history.

(56) References Cited

U.S. PATENT DOCUMENTS

| | | | | |
|---|---|---|---|---|
| 5,593,531 A | * | 1/1997 | Penn | ..................... G03G 15/221 156/272.6 |
| 2005/0208168 A1 | | 9/2005 | Hickerson et al. | |
| 2009/0304952 A1 | * | 12/2009 | Kritchman | .......... B29C 67/0059 427/595 |
| 2013/0186558 A1 | * | 7/2013 | Comb | ................. B29C 67/0051 156/277 |

FOREIGN PATENT DOCUMENTS

| | | |
|---|---|---|
| WO | 2005/089463 A2 | 9/2005 |
| WO | 2013/044047 A1 | 3/2013 |

* cited by examiner

*Primary Examiner* — John L Goff, II
(74) *Attorney, Agent, or Firm* — Venable LLP

(57) ABSTRACT

A shaping apparatus that fabricates a three-dimensional object by stacking a material layer formed of a shaping material, comprising: a conveyance belt that supports and conveys the material layer; a heating roller that is one of rollers supporting the conveyance belt and heats the material layer supported by the conveyance belt via the conveyance belt; and a shaping section that stacks the material layer on a downstream side of the heating roller in a conveyance direction, wherein a size of a contact area as an area in which the heating roller and the conveyance belt are in contact with each other in the conveyance direction is larger than a maximum possible size of the material layer in the conveyance direction.

14 Claims, 7 Drawing Sheets

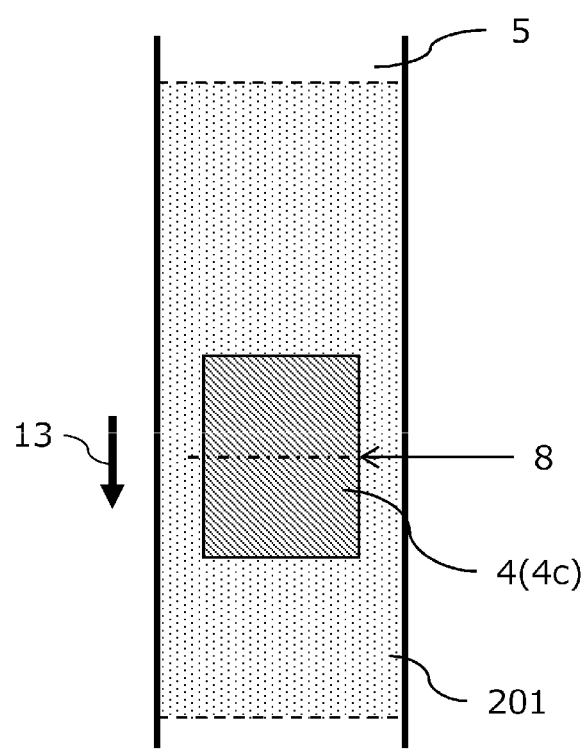

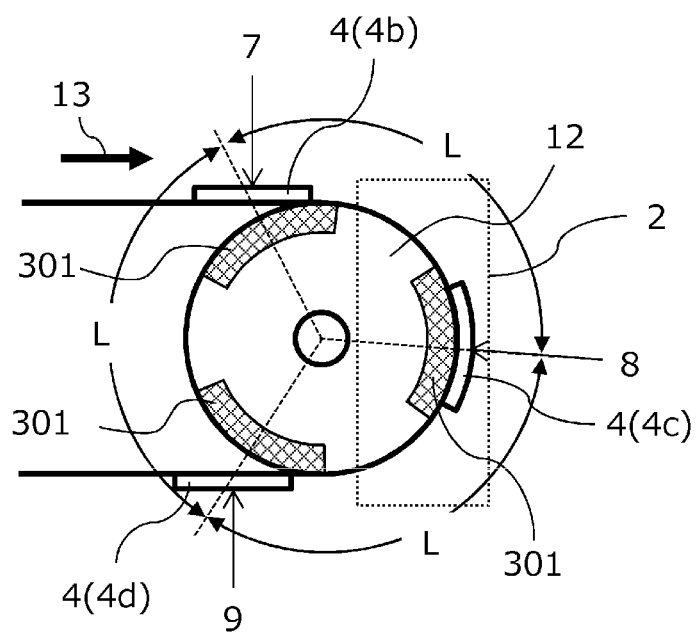

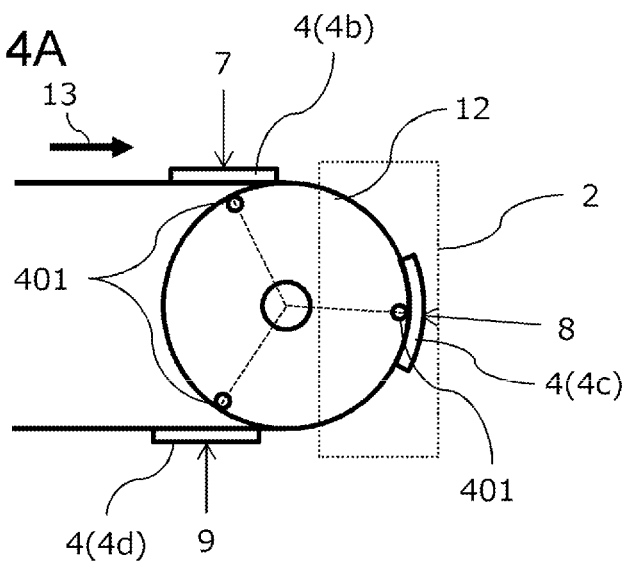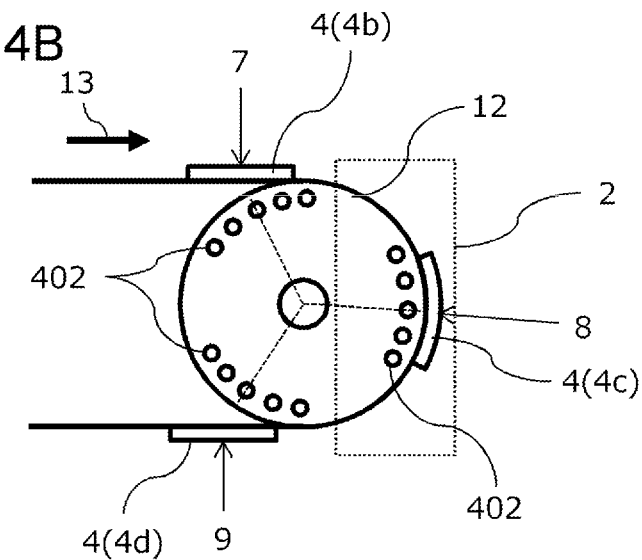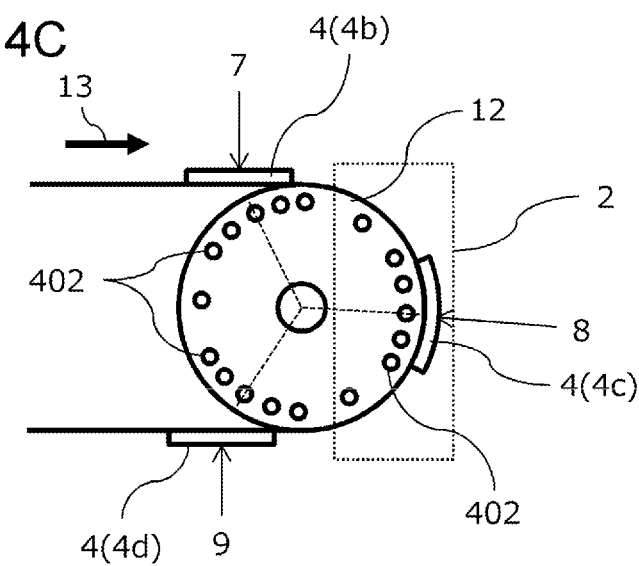

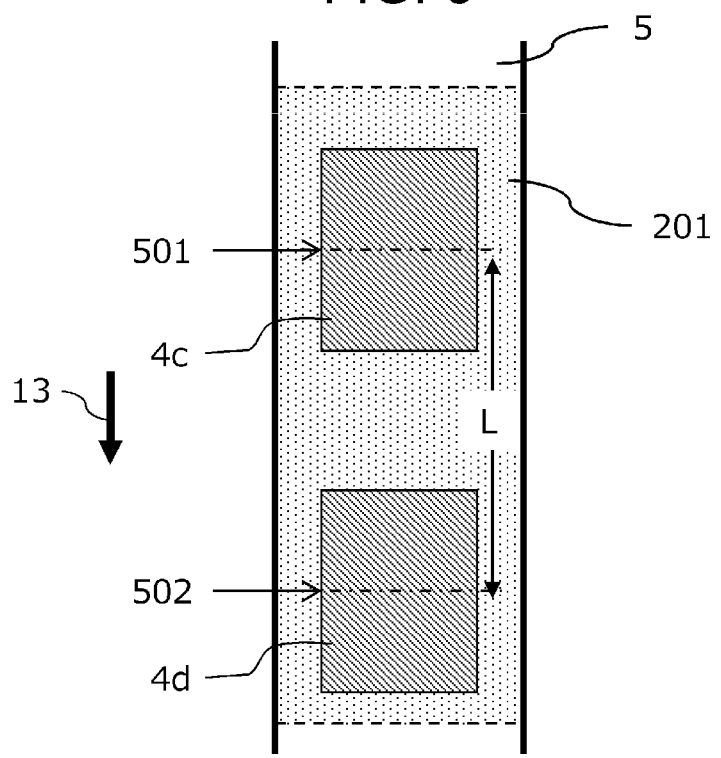

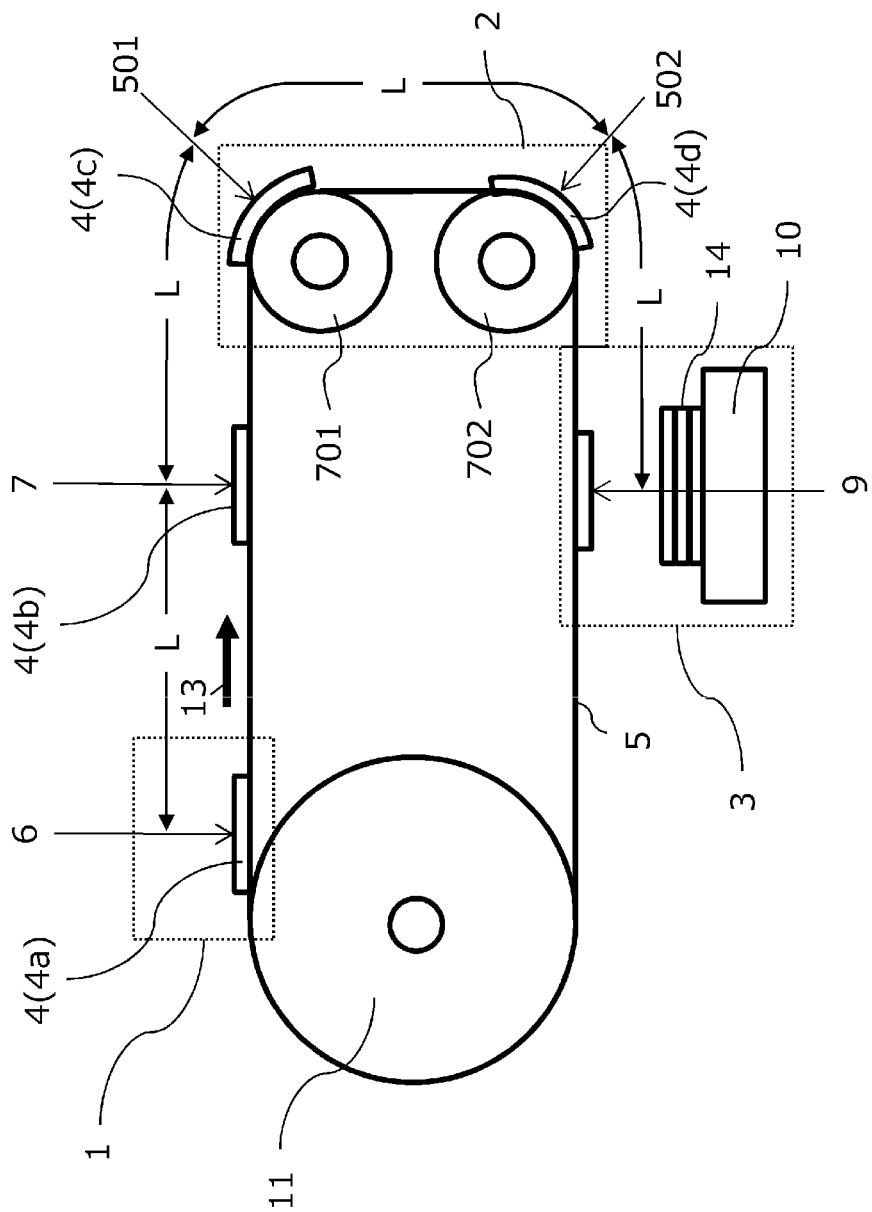

SHAPING APPARATUS AND SHAPING METHOD

BACKGROUND OF THE INVENTION

Field of the Invention

The present invention relates to a shaping apparatus and a shaping method.

Description of the Related Art

A shaping method and a shaping apparatus called additive manufacturing (AM), a three-dimensional printer, and rapid prototyping (RP) have been attracting attention (hereinafter the technique of this type is referred to as an AM technique). The AM technique is a technique in which a large number of pieces of cross-sectional shape data (referred to as slice data) are generated by slicing three-dimensional shape data, each layer is formed according to each slice data with a shaping material, and a three-dimensional object (solid object) is shaped by sequentially stacking the layers formed of the shaping material and fixing them. The AM technique does not require a mold and is capable of forming a complicated shape, and hence the AM technique is used for prototyping of a component and manufacturing of a single product or a small-lot product.

In the AM technique, various shaping systems are proposed conventionally. For example, WO 2013/044047 discloses a shaping method and a shaping apparatus that use an electrophotographic system. The shaping system disclosed in WO 2013/044047 is a system in which each layer (hereinafter referred to as a material layer) is formed of a shaping material based on slice data, and the formed material layer is heated and melted by a heater or the like and is stacked on a shaping platform.

SUMMARY OF THE INVENTION

In the shaping system described above, when temperature variations occur in the material layer when the material layer is heated and melted, unevenness of the density of a shaping object or a transfer failure (stacking failure) of the material layer from a conveyance belt to the shaping object is caused. To cope with this, in the apparatus of WO 2013/044047, the material layer is uniformly heated and melted by a noncontact heating system that uses a radiant heater or the like. However, in the noncontact heating system that uses the radiant heater or the like, efficiency of heating to the material layer is low so that it takes time to heat the material layer until a melting temperature is reached, which has caused a reduction in shaping speed. In WO 2013/044047, means for heating the material layer by causing the material layer to pass through a heating roller is also used as a contact heating system. However, in this system, a difference in heating end time between the tip and the rear end of the material layer occurs so that the temperature variations occur, which may cause the stacking failure. In addition, as the contact heating system, it is conceivable to use a system in which a heated block is pressed against the material layer via the back surface of a belt but, the temperature variations occur due to floating of the belt or unevenness of a contact pressure, which may cause the stacking failure.

The present invention has been made in view of the above problems, and an object thereof is to provide a technique that allows uniform heating of the material layer.

The present invention in its first aspect provides a shaping apparatus that fabricates a three-dimensional object by stacking a material layer formed of a shaping material, comprising: a conveyance belt that supports and conveys the material layer; a heating roller that is one of rollers supporting the conveyance belt and heats the material layer supported by the conveyance belt via the conveyance belt; and a shaping section that stacks the material layer on a downstream side of the heating roller in a conveyance direction, wherein a size of a contact area as an area in which the heating roller and the conveyance belt are in contact with each other in the conveyance direction is larger than a maximum possible size of the material layer in the conveyance direction.

The present invention in its second aspect provides a shaping method for fabricating a three-dimensional object by stacking a material layer formed of a shaping material, the shaping method comprising the steps of: supporting and conveying the material layer with a conveyance belt supported by a plurality of rollers that include a heating roller; temporarily stopping the conveyance belt in a state in which the entire material layer is positioned in a contact area as an area in which the heating roller and the conveyance belt are in contact with each other, and heating the material layer with the heating roller; and conveying the heated material layer to a stacking position with the conveyance belt and stacking the material layer.

According to the present invention, it is possible to uniformly heat the material layer.

Further features of the present invention will become apparent from the following description of exemplary embodiments with reference to the attached drawings.

BRIEF DESCRIPTION OF THE DRAWINGS

FIG. 2 is a view schematically showing a heating position in a heating section of the first embodiment;

FIG. 3 is a view schematically showing a roller diameter of a heating roller and a preferred disposition of the heating section;

FIGS. 4A to 4C are views schematically showing a preferred disposition of a temperature sensor and a heater of the heating roller;

FIG. 6 is a view schematically showing the heating position in the heating section of the second embodiment; and FIG. 7 is a view schematically showing the principal configuration of the shaping apparatus of a third embodiment.

DESCRIPTION OF THE EMBODIMENTS

Figure 1:
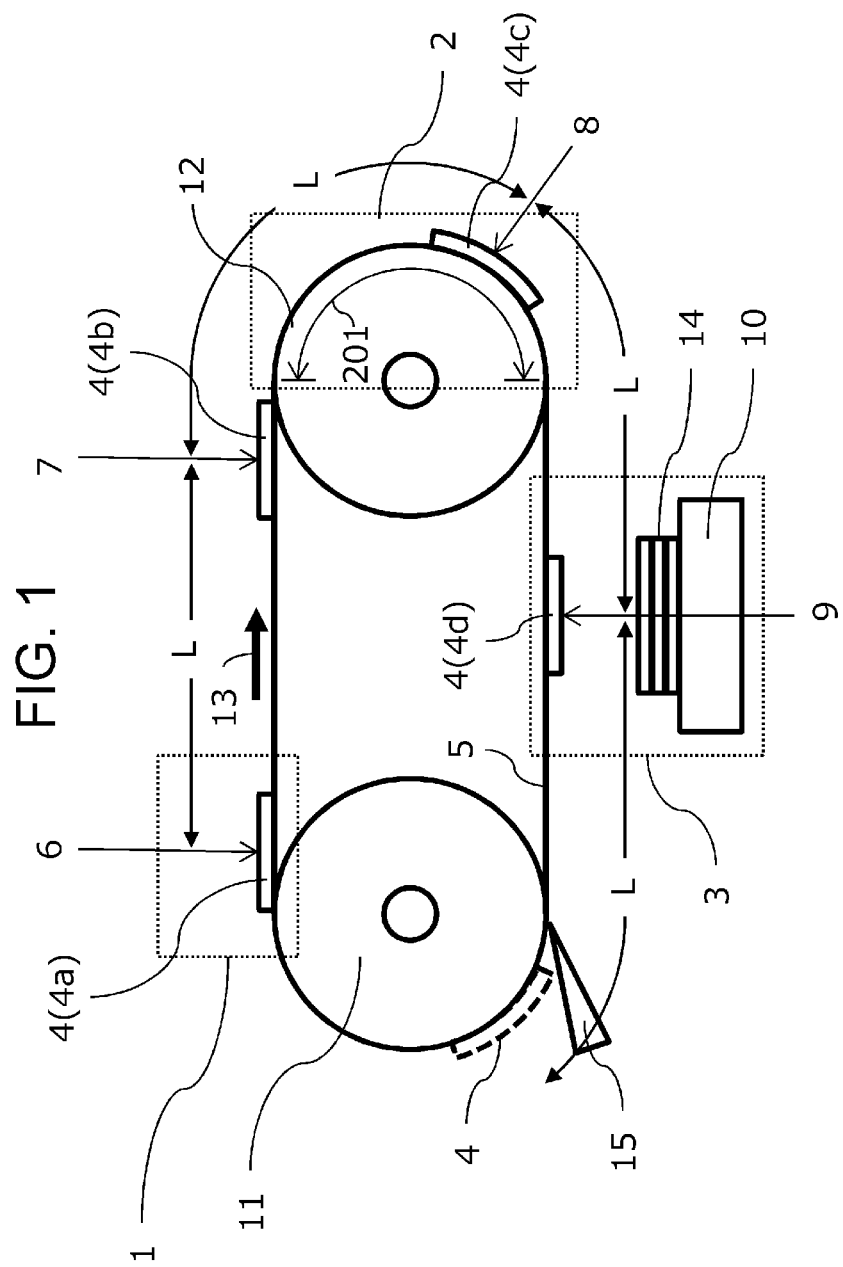
FIG. 1 is a view schematically showing a principal configuration of a shaping apparatus of a first embodiment.

The present invention relates to a shaping apparatus and a shaping method for fabricating a three-dimensional object (solid object) by stacking a material layer formed of a shaping material. In preferred embodiments of the present invention described below, a contact heating system that uses a heating roller is adopted as means for heating the material layer. Specifically, the shaping apparatus has a conveyance belt that supports and conveys the material layer, and at least one of a plurality of rollers that support the conveyance belt is used as the heating roller. The heating roller heats the material layer supported by the conveyance belt via the conveyance belt. Herein, the conveyance belt and the heating roller are preferably designed such that the size (length) of an area in which the heating roller and the conveyance belt are in contact with each other (hereinafter referred to as a contact area) in a conveyance direction is larger than the maximum possible size (length) of the material layer in the conveyance direction. In the contact area, the surface of the heating roller comes into close contact with the conveyance belt with a tension applied to the conveyance belt, and thermal energy from the heating roller is transferred effectively and stably, and hence it is easy to maintain the temperature in the contact area uniformly. Consequently, according to the above design, it becomes possible to perform the heating in a state in which the entire material layer is positioned in the contact area (i.e., in the area in which the temperature is substantially uniform), and hence it is possible to heat the entire material layer uniformly, and reduce temperature variations in the material layer as much as possible. Note that the width of each of the conveyance belt and the heating roller is also designed so as to be larger than the maximum possible size (length) of the material layer in a width direction.

As the shaping material, it is possible to select various materials in accordance with the use, function, and purpose of a solid object to be fabricated. In the present specification, a material constituting a three-dimensional object as a shaping target is referred to as "a build material", and a portion formed of the build material is referred to as a build body. A material constituting a support body for supporting the build body in the process of fabrication (e.g., a pillar supporting an overhang portion from below) is referred to as "a support material". In addition, in the case where it is not necessary to distinguish between them, a term "shaping material" is simply used. As the build material, it is possible to use thermoplastic resins such as, e.g., polyethylene (PE), polypropylene (PP), ABS, and polystyrene (PS). Further, as the support material, in order to facilitate removal from the build body, it is possible to use a material having thermoplasticity and water solubility preferably. Examples of the support material include carbohydrate, polylactic acid (PLA), polyvinyl alcohol (PVA), and polyethylene glycol (PEG).

In addition, in the present specification, digital data obtained by slicing three-dimensional shape data of a solid model as the shaping target into several layers along a stacking direction is referred to as "slice data". A layer formed of the shaping material based on the slice data is referred to as "a material layer". Further, a target solid model that is to be fabricated by using the shaping apparatus (i.e., a three-dimensional object represented by three-dimensional shape data given to the shaping apparatus) is referred to as "a shaping target object", and a three-dimensional object (solid object) fabricated (outputted) by the shaping apparatus is referred to as "a shaping object". In the case where the shaping object includes the support body, a portion obtained by excluding the support body corresponds to "the build body" that constitutes the shaping target object.

First Embodiment

Hereinbelow, a first embodiment of the present invention will be described with reference to the drawings. First, the configuration of the principal portion of the shaping apparatus according to the present embodiment will be described by using FIG. 1.

The shaping apparatus mainly has three function sections of a material layer forming section 1, a heating section 2, and a shaping section 3. In addition, the shaping apparatus has a conveyance belt 5 serving as a conveyance member that supports a material layer 4 that is formed in the material layer forming section 1 and conveys the material layer 4 sequentially to the heating section 2 and the shaping section 3. The conveyance belt 5 is an endless belt formed of, e.g., a resin and a polyimide, and is supported by a plurality of rollers (a conveyance roller 11 and a heating roller 12 in FIG. 1). The conveyance belt 5 of the present embodiment is controlled so as to perform what is called intermittent conveyance in which conveyance and stop are alternately repeated. At least processes of forming (transfer), heating, and stacking of the material layer 4 are performed in a state in which the conveyance belt 5 is temporarily stopped. A conveyance time and a stop time may be appropriately designed in accordance with a conveyance distance and a time required for each process (in the present embodiment, the conveyance time is set to 1 second, and the stop time is set to 5 seconds). Hereinbelow, the operation of each process will be described.

The material layer forming section 1 receives slice data of each layer from an external data processing device that is not shown, performs image forming based on the slice data, and forms the material layer 4 formed of the shaping material. An electrophotographic system or an inkjet system can be applied to the image forming. The formed material layer 4 is transferred onto the conveyance belt 5 that is stopped by a transfer mechanism that is not shown. As the transfer method, transfer that uses a transfer roller or stamp transfer (a method that performs collective transfer on a per plane basis) can be used. Hereinafter, a position at which the transfer by the material layer forming section 1 is performed (a position in a conveyance direction to which a reference point (e.g., the center point) of the material layer 4 of the maximum size is transferred when it is assumed that the material layer 4 of the maximum size that can be formed in the material layer forming section 1 is formed) is referred to as "a transfer position 6". A reference numeral 4a of FIG. 1 indicates the material layer transferred to the transfer position 6.

When the transfer of the material layer 4 is completed, the conveyance belt 5 rotates with the drive of the conveyance roller 11 or the heating roller 12, and conveys the material layer 4 in a conveyance direction 13. Subsequently, when the material layer 4 is transferred to the heating section 2, the conveyance belt 5 stops. In the heating section 2, the material layer 4 on the conveyance belt 5 is heated with thermal energy given via the conveyance belt 5 from the heating roller 12. By setting the heating temperature to a temperature not less than the melting temperature of the material constituting the material layer, it is possible to change the powdery or particulate material layer 4 to the material layer 4 that is integrated into a sheet-like shape.

Herein, a position at which the heating by the heating roller 12 is performed (a position in the conveyance direction at which the reference point (e.g., the center point) of the material layer 4 of the maximum size stops for the heating when it is assumed that the material layer 4 of the maximum size that can be formed in the material layer forming section 1 is formed) is referred to as "a heating position 8". A reference numeral 4c indicates the material layer that is stopped at the heating position 8. The heating position 8 is set such that the entire material layer 4c that is stopped fits within a contact area 201 (an area in which the surface of the heating roller 12 and the back surface of the conveyance belt 5 are in contact with each other). FIG. 2 shows a positional relationship of the surface (conveyance surface) of the conveyance belt 5, the contact area 201, the heating position 8, and the material layer 4 (4c) that is stopped. FIG. 2 is a plan view when viewed from the direction of the normal to the surface (conveyance surface) of the conveyance belt 5. Such a positional relationship can be realized by appropriately designing the roller size (roller diameter) of the heating roller 12, the disposition of a roller group that supports the conveyance belt 5, and setting of the heating position 8.

The entire area of the material layer 4 (4c) is heated at the same time in a state in which the material layer 4 (4c) is stopped at the heating position 8. In the contact area 201, the surface of the heating roller 12 comes into close contact with the back surface of the conveyance belt 5 with the tension applied to the conveyance belt 5, and thermal energy from the heating roller 12 is transferred effectively and stably. As a result, the temperature in the contact area 201 is maintained substantially uniformly. In addition, as shown in FIG. 2, by performing the heating in a state in which the entire material layer 4 is positioned in the contact area 201 (i.e., in the area in which the temperature is substantially uniform), it is possible to uniformly heat the entire material layer 4, and reduce the temperature variations in the material layer 4 as much as possible. Therefore, according to the configuration of the present embodiment, it is possible to prevent unevenness of the density of a shaping object 14 and a transfer failure (stacking failure) of the material layer 4 from the conveyance belt 5 to the shaping object 14 that are caused by the temperature variations in the material layer 4 when the material layer 4 is heated and melted.

After the heating of the material layer 4, the conveyance belt 5 rotates and conveys the material layer 4 in the conveyance direction 13. Subsequently, when the material layer 4 is conveyed to the shaping section 3, the conveyance belt 5 stops again. In the shaping section 3, the material layer 4 having moved to a stacking position 9 is stacked on a shaping platform 10 (or the shaping object 14 on the shaping platform 10). By repeatedly performing the processes of the forming (transfer), the heating, and the stacking of the material layer described above, it is possible to form the three-dimensional shaping object 14. Note that "the stacking position 9" denotes a position in the conveyance direction at which the reference point (e.g., the center point) of the material layer 4 of the maximum size stops for the stacking when it is assumed that the material layer 4 of the maximum size that can be formed in the material layer forming section 1 is formed.

As shown in FIG. 1, the present embodiment adopts a configuration in which a waiting position 7 for the material layer 4 is disposed between the material layer forming section 1 and the heating section 2. A reference numeral 4b indicates the material layer that is stopped at the waiting position 7. Thus, instead of conveying the material layer 4 from the material layer forming section 1 to the heating section 2 directly (nonstop), the stop position unrelated to the shaping process such as the waiting position 7 may be provided. By providing the waiting position 7, it is possible to increase flexibility in designing of the shaping apparatus such as the disposition of each function section, the length and disposition of a conveyance path of the conveyance belt, and the disposition of the roller. The number of the waiting positions 7 and the disposition thereof may be determined arbitrarily. For example, a plurality of the waiting positions may be disposed between the material layer forming section 1 and the heating section 2, and one or more waiting positions may be disposed between the heating section 2 and the shaping section 3.

In the present embodiment, the transfer position 6, the waiting position 7, the heating position 8, and the stacking position 9 are disposed along the conveyance direction 13 of the conveyance belt 5 at equal intervals. In other words, each of the conveyance distance from the transfer position 6 to the waiting position 7, the conveyance distance from the waiting position 7 to the heating position 8, and the conveyance distance from the heating position 8 to the stacking position 9 is set to a length L. On the other hand, the conveyance belt 5 is capable of supporting a plurality of material layers 4a to 4d along the conveyance direction 13, and each of conveyance pitches of the material layers 4a to 4d (intervals of the reference points (e.g., the center points) of the material layers 4a to 4d) is set to L similarly to each of the intervals of the positions 6 to 9. By adopting such a configuration, when the conveyance belt 5 is stopped in order to transfer the material layer 4a, another material layer 4b positioned on the downstream side in the conveyance direction stops at the waiting position 7, the material layer 4c positioned further on the downstream side stops at the heating position 8, and the material layer 4d positioned further on the downstream side stops at the stacking position 9. Consequently, it is possible to perform the transfer of the material layer 4a, the heating of the material layer 4c, and the stacking of the material layer 4d concurrently (simultaneously), and it becomes possible to significantly reduce a time required to fabricate the shaping object. Note that, in FIG. 1, the conveyance distance (=2 L) from the transfer position 6 to the heating position 8 is set to a distance that is twice the conveyance pitch (=L) of the material layer 4, and the conveyance distance from the heating position 8 to the stacking position 9 is set equal to the conveyance pitch of the material layer 4, but the present embodiment is not limited to this configuration. When the conveyance distance between the individual positions is an integral multiple of the conveyance pitch of the material layer 4, it becomes possible to execute the processes at the individual positions concurrently.

In addition, a cleaning blade 15 (cleaning device) for removing the shaping material remaining on the conveyance belt 5 may be provided on the downstream side of the stacking position 9 or the upstream side of the transfer position 6. In the case where the cleaning blade 15 is provided, the cleaning blade 15 is provided away from the position at which the material layer 4 can stop, and the tip of the cleaning blade 15 may be brought into contact with the conveyance belt 5. By adopting such a disposition, the material layer 4 remaining on the conveyance belt 5 moves past the tip of the cleaning blade 15 with one conveyance operation, and hence it is possible to scrape off the entire remaining material layer 4 under substantially constant conditions (the temperature of the material, a scraping speed, and the like). With this, it is possible to eliminate a cleaning failure as much as possible. Note that, in FIG. 1, the cleaning blade 15 is disposed on the upstream side of the position at which the remaining material layer 4 can stop, but the cleaning blade 15 may also be disposed on the downstream side of the position at which the remaining material layer 4 can stop.

Further, the circumference of the heating roller 12 preferably has a length equal to the conveyance distance from the transfer position 6 (i.e., the position at which the forming (transfer) of the material layer 4 by the material layer forming section 1 is performed) to the stacking position 9. With this, the conveyance distance from the transfer to the stacking becomes substantially constant (equal to the circumference of the heating roller 12), and hence it is possible to reduce a conveyance error generated by the eccentricity of the heating roller 12 as much as possible, and it is possible to improve stacking accuracy and, by extension, the quality of the shaping object.

Next, the preferable configuration of the heating roller of the shaping apparatus according to the present embodiment will be described by using FIG. 3. As shown in FIG. 3, the heating roller 12 preferably has a circumference (=n×L) corresponding to n times the conveyance pitch (=L) of the material layer 4. Note that n is an integer of 2 or more, and FIG. 3 shows an example in which n=3 is satisfied.

In the case where the circumference of the heating roller 12 is set in this manner, the intermittent conveyance having the conveyance pitch L can be realized by rotating the heating roller 12 by 1/n of the circumference each time, and hence conveyance control is simplified. In addition, when the conveyance belt 5 stops, one of specific areas (hatched areas 301 in FIG. 3) on the outer peripheral surface of the heating roller 12 is positioned at the heating position 8. Consequently, it is not necessary to provide the heating section for heating the material layer 4 on the entire outer peripheral surface of the heating roller 12, and it is only necessary to dispose at least n heating sections at equal intervals (equal angles) in a circumferential direction (hereinafter, the hatched areas in FIG. 3 are referred to as "heating areas 301"). Each heating area 301 may have a size (area) at least equal to or larger than the maximum size of the material layer 4.

Next, advantages of the configuration in which the heating area 301 is limited to a partial area as shown in FIG. 3 will be described. When the size of the heating area 301 is small and the position thereof is fixed, as shown in FIG. 4A, it is possible to accurately measure the temperature of each heating area 301 by providing a temperature sensor 401 such as a thermopile for each heating area 301. By individually controlling the temperature of each heating area 301 based on the accurate measured value, it is possible to reduce a temperature error between the heating areas 301. With this, it is possible to implement the stable heating process that uses substantially the same temperature to all of the material layers, and hence the accuracy and quality of the shaping object can be expected to be improved.

In addition, it is desired that the temperature control is performed such that the heating area 301 has a substantially uniform temperature distribution because of necessity to uniformly heat the material layer 4. In this respect, when the size of the heating area 301 is small, there is an advantage that it is easy to make the temperature distribution uniform. For example, as shown in FIG. 4B, it is only necessary to provide heaters 402 only at positions corresponding to the heating areas 301. Alternatively, as shown in FIG. 4C, it is also preferable to adopt a configuration in which the number of the heaters 402 provided at the positions corresponding to the heating areas 301 is larger than the number of the heaters 402 provided at positions between the heating areas 301. As the heater 402, it is possible to use, e.g., a cartridge heater preferably. With such a configuration, it is possible to efficiently heat the heating area 301 and also reduce the temperature variations in the heating area 301. In addition, it is possible to reduce the number of the heaters as compared with the case where the heaters are disposed at equal intervals on the entire circumference of the heating roller 12, and hence it is also possible to achieve a reduction in cost.

Second Embodiment

Hereinbelow, a second embodiment of the present invention will be described with reference to the drawings. In the first embodiment, one heating position 8 is provided in the contact area of the heating roller 12 and the conveyance belt 5. In contrast to the first embodiment, a plurality of the heating positions 8 are provided in the contact area along the conveyance direction in the second embodiment.

In the heating section 2, the melting temperature differs depending on the shaping material to be used, and hence heating conditions such as a heating time and the temperature of the heating roller 12 differ. Only one heating position 8 is disposed in the shaping apparatus of the first embodiment shown in FIG. 1, but a plurality of the heating positions may be provided in the contact area depending on the heating conditions. Alternatively, it is also possible to add a noncontact heating device such as an infrared heater in addition to the heating roller 12. The time during which the material layer 4 is stopped at the heating position 8 substantially corresponds to the heating time in the first embodiment, but there is a possibility that the heating time becomes longer than a stacking time required for stacking onto the shaping object 14 depending on the shaping material to be used, and the heating time can be a rate determining factor of a shaping speed. It is possible to increase the temperature of the heating roller 12 in order to reduce the heating time, but the increase in the temperature of the heating roller 12 may cause the failure of a component resulting from an increase in power consumption or temperature, and is not preferable. In such a case, as in the present embodiment, the configuration in which a plurality of the heating positions are disposed is preferable. By heating the material layer 4 at a plurality of positions, even when the heating time (stop time) at each heating position is reduced, it is possible to secure the sufficient heating time in total. Therefore, even in the case where the shaping material having a high melting temperature is used, it is possible to reduce the heating time (stop time) at each heating position, and hence it is possible to prevent the heating time from becoming the rate determining factor of the shaping speed, and achieve a reduction in shaping time.

Figure 5:
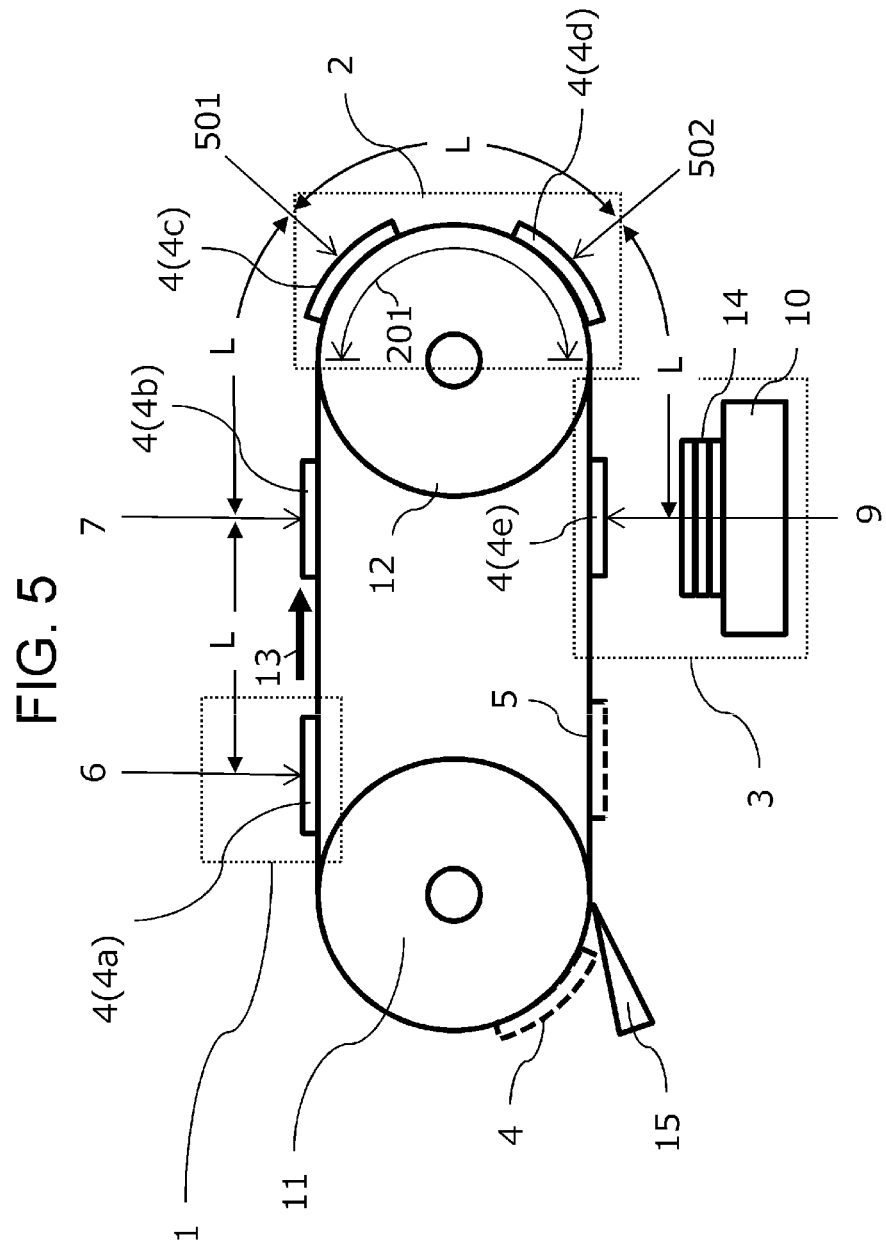
FIG. 5 is a view schematically showing the principal configuration of the shaping apparatus of a second embodiment.

FIG. 5 schematically shows the configuration of the shaping apparatus in which two heating positions of a primary heating position 501 and a secondary heating position 502 are disposed in the heating section 2. FIG. 6 shows a positional relationship of the surface (conveyance surface) of the conveyance belt 5, the contact area 201, the primary heating position 501, the secondary heating position 502, and the material layers 4c and 4d that are stopped. As shown in FIG. 5, the two heating positions 501 and 502 are disposed for one heating roller 12. As a result, as shown in FIG. 6, the roller size (roller diameter) of the heating roller 12 and the disposition of the roller group are designed such that the primary heating position 501 and the secondary heating position 502 can be disposed at an interval corresponding to the conveyance pitch L in the contact area 201. Thus, by disposing two heating positions, the time during which the material layer 4 is stopped in the contact area 201 is doubled, and hence it is possible to halve the stop time at each heating position as compared with the case where one heating position is disposed.

Third Embodiment

Hereinbelow, a third embodiment of the present invention will be described with reference to the drawings. In the second embodiment, a plurality of the heating positions are provided for one heating roller 12. In contrast to the second embodiment, the same effect is obtained by providing a plurality of the heating rollers in the third embodiment.

As shown in FIG. 7, the shaping apparatus of the present embodiment has two heating rollers of a primary heating roller 701 and a secondary heating roller 702. The material layer 4 stops at the primary heating position 501 of the primary heating roller 701 and the secondary heating position 502 of the secondary heating roller 702, and is heated. In this case as well, similarly to the first embodiment, since it is necessary to heat the entire material layer 4 at the same time, the roller diameter and the disposition of the roller are appropriately set such that the size of the contact area of the individual heating rollers 701 and 702 and the conveyance belt 5 in the conveyance direction is not less than the maximum size of the material layer 4. With this configuration as well, it is possible to achieve the operation and effect similar to those in the second embodiment.

The number of the heating rollers to be used does not need to match the number of the heating positions, and any number of the heating rollers may be disposed in correspondence to the apparatus configuration. For example, two heating rollers having different roller diameters may be used, two heating positions may be set for the roller having a larger roller diameter, and one heating position may be set for the roller having a smaller roller diameter. By using a plurality of the heating rollers, it is possible to uniformly heat the material layer without reducing the shaping speed while maintaining the individual roller sizes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-149421, filed on Jul. 29, 2015 and Japanese Patent Application No. 2016-136287, filed on Jul. 8, 2016, which are hereby incorporated by reference herein in their entirety.

What is claimed is:

1. A shaping apparatus that fabricates a three-dimensional object by stacking a material layer formed of a shaping material, the shaping apparatus comprising:
   a conveyance belt that supports and conveys the material layer, wherein the conveyance belt is supported by a plurality of rollers;
   a material layer forming section that forms the material layer on the conveyance belt at a constant pitch;
   a heating roller that is one of the plurality of rollers supporting the conveyance belt and that heats the material layer supported by the conveyance belt via the conveyance belt; and
   a shaping section that stacks the material layer on a downstream side of the heating roller in a conveyance direction,
   wherein the heating roller has a circumference corresponding to n times the pitch,
   wherein n is an integer of 2 or more, and has heating areas for heating the material layer disposed at an equal interval in a circumferential direction, and wherein a distance along the conveyance belt from a position where the material layer forming section forms the material layer on the conveyance belt to each of the heating areas is m times the pitch, wherein m is an integer of 1 or more, and
   wherein heaters are provided only at positions corresponding to the heating areas, or are provided such that the number of the heaters provided at the positions corresponding to the heating areas is larger than the number of the heaters provided at a position between the heating areas.

2. The shaping apparatus according to claim 1, wherein the conveyance belt is controlled such that the material layer temporarily stops at a heating position that is a position at which the heating by the heating roller is performed.

3. The shaping apparatus according to claim 2, wherein the heating position is set such that the entire material layer fits within a contact area where the conveyance belt and the heating roller are in contact with each other.

4. The shaping apparatus according to claim 2, wherein the conveyance belt intermittently conveys the material layer such that the material layer temporarily stops at a stacking position that is a position at which the stacking by the shaping section is performed.

5. The shaping apparatus according to claim 4, wherein the conveyance belt is capable of supporting a plurality of the material layers along the conveyance direction, and
   wherein when a first material layer stops at the heating position, a second material layer positioned on the downstream side of the first material layer in the conveyance direction stops at the stacking position, and the heating of the first material layer and the stacking of the second material layer are concurrently performed.

6. The shaping apparatus according to claim 5, wherein a conveyance distance from the heating position to the stacking position is an integral multiple of the pitch.

7. The shaping apparatus according to claim 1, wherein a temperature sensor that is used for temperature control of the heating roller is provided at a position corresponding to a heating area of the heating areas.

8. The shaping apparatus according to claim 1, wherein a plurality of heating positions are set in the contact area along the conveyance direction.

9. The shaping apparatus according to claim 1, wherein the heating roller includes:
   a plurality of temperature sensors at positions respectively corresponding to the heating areas.

10. The shaping apparatus according to claim 1, wherein heaters are provided such that the number of the heaters provided at positions corresponding to the heating areas of the heating roller is larger than the number of the heaters provided at other positions.

11. The shaping apparatus according to claim 1, wherein a plurality of the heating rollers are provided along the conveyance direction.

12. The shaping apparatus according to claim 1, wherein heaters are provided only at positions corresponding to the heating areas.

13. The shaping apparatus according to claim 1, wherein heaters are provided such that the number of the heaters provided at the positions corresponding to the heating areas is larger than the number of the heaters provided at a position between the heating areas.

14. A shaping apparatus that fabricates a three-dimensional object by stacking a material layer formed of a shaping material, the shaping apparatus comprising:
   a conveyance belt that supports and conveys the material layer, wherein the conveyance belt is supported by a plurality of rollers;
   a material layer forming section that forms the material layer on the conveyance belt at a constant pitch;

a heating roller that is one of the plurality of rollers supporting the conveyance belt and that heats the material layer supported by the conveyance belt via the conveyance belt; and a shaping section that stacks the material layer on a downstream side of the heating roller in a conveyance direction, wherein the heating roller has a circumference corresponding to n times the pitch, wherein n is an integer of 2 or more, and has (a) heating areas for heating the material layer disposed at an equal interval in a circumferential direction and (b) a less-heated area between the heating areas, and wherein a distance along the conveyance belt from a position where the material layer forming section forms the material layer on the conveyance belt to each of the heating areas is m times the pitch, wherein m is an integer of 1 or more.

\* \* \* \* \*